United States Patent
Trenchard et al.

(10) Patent No.: US 12,517,102 B2
(45) Date of Patent: Jan. 6, 2026

(54) METHOD AND SYSTEM TO DETERMINE THE SIZE OF A GAS EMISSION EXPELLED FROM A PROCESSING FACILITY

(71) Applicant: Honeywell International Inc., Charlotte, NC (US)

(72) Inventors: Andrew J. Trenchard, Romsey (GB); Bas Kastelein, Hippolytushoef (NL)

(73) Assignee: Honeywell International Inc., Charlotte, NC (US)

( * ) Notice: Subject to any disclaimer, the term of this patent is extended or adjusted under 35 U.S.C. 154(b) by 400 days.

(21) Appl. No.: 18/114,094

(22) Filed: Feb. 24, 2023

(65) Prior Publication Data
US 2024/0288411 A1    Aug. 29, 2024

(51) Int. Cl.
*G01W 1/06*    (2006.01)
*G01N 33/00*    (2006.01)

(52) U.S. Cl.
CPC ..... *G01N 33/0075* (2013.01); *G01N 33/0011* (2013.01); *G01W 1/06* (2013.01); *G01N 33/0068* (2024.05)

(58) Field of Classification Search
CPC ........... G01N 33/0011; G01N 33/0075; G01N 33/0068; G01W 1/06
See application file for complete search history.

(56) References Cited

U.S. PATENT DOCUMENTS

| | | |
|---|---|---|
| 8,510,059 B2 | 8/2013 | Prince |
| 10,663,367 B2 | 5/2020 | Dittberner et al. |
| 10,775,258 B2 | 9/2020 | Muralidhar et al. |
| 2017/0176182 A1* | 6/2017 | Rella ....... G01M 3/22 |
| 2021/0017926 A1* | 1/2021 | Alkadi ....... G01N 21/3504 |
| 2021/0055180 A1* | 2/2021 | Thorpe ....... G01N 33/0004 |
| 2023/0282316 A1* | 9/2023 | Malvar Maua ....... G16C 20/80 706/12 |
| 2023/0304982 A1* | 9/2023 | Eichenlaub ....... G01N 33/0062 |

* cited by examiner

*Primary Examiner* — Mohamed Charioui
(74) *Attorney, Agent, or Firm* — Paschall & Associates, LLC; James C. Paschall; Anthony Miologos

(57) ABSTRACT

A method and system for determining the size of a gas emission expelled from a processing facility includes obtaining gas sensor data from a plurality of gas sensors and wind speed and direction data from at least one weather station located at the processing facility. The wind speed and direction data is correlated with the gas sensor data to triangulate a location of the gas emission. A mean concentration of the gas emission is calculated, and the size of the gas emission is estimated by using at least one of a base calculation model, a gaussian plume (GP) model fit, or an event probability model fit.

18 Claims, 7 Drawing Sheets

METHOD AND SYSTEM TO DETERMINE THE SIZE OF A GAS EMISSION EXPELLED FROM A PROCESSING FACILITY

TECHNICAL FIELD

This disclosure is generally directed to the field of atmospheric monitoring for gas emissions. More specifically, it relates to a method and system to determine the size of a gas emission expelled from a processing facility.

BACKGROUND

In many jurisdictions there are strict controls on industrial greenhouse gas emissions, both from combustion sources and from fugitive leaks or vented gas emissions expelled from refinery plant equipment. While there is a greater quantity of combustion related emissions, fugitive or vented emissions of uncombusted plant chemicals, such as for example methane gas have a much greater global warming potential for a given mass of emission.

Chemical manufacturing plants, petroleum refineries and other industrial facilities in developed nations are required to make an inventory of all plant equipment assets, such as valves, pumps, flanges, burners, etc., that could potentially be a source of gas emissions. Some process plants may also directly vent gas to the atmosphere to relieve an overpressure incident and hence contribute to the overall emissions. A plant's operating company is required to periodically monitor the gas concentrations near each asset to ensure there is no significant discharges of uncombusted gas from the plant's assets into the atmosphere. This is normally done manually. A technician using a hand-held detection device, as defined by the applicable standards, uses the detection device to inventory the assets for possible gas emissions. This approach is very time consuming and hence expensive. At large refineries and plants up to 25 technicians are employed full time to monitor all the equipment and assets to make observations and quantifications of gas emissions. The individual assets are only monitored infrequently, such as for example, once a quarter or once a year due to the substantial number of assets required to be monitored. Additionally, the manual methods fail to accurately monitor the rate of gas emissions being expelled into the atmosphere due to the manual process being error prone. Even in cases where the manual methods are successfully performed, the resulting observations may be too vague or inaccurate to provide a meaningful location and a quantifiable size for a gas emission.

SUMMARY

This disclosure relates to a method and system that determines the size of a gas emission expelled from a processing facility into the atmosphere.

A first embodiment of the invention is a method for determining the size of a gas emission expelled from a processing facility, comprising the steps of obtaining gas sensor data from a plurality of gas sensors, and wind speed and direction data from at least one weather station located at the processing facility; correlating the wind speed and direction data with the gas sensor data to triangulate a location of the gas emission; calculating a mean concentration of the gas emission; and estimating the size of the gas emission using at least one of a base calculation model, a gaussian plume (GP) model fit, or an event probability model fit.

A second embodiment of the invention is a system to determine the size of a gas emission expelled from a processing facility, the system comprising a plurality of gas sensors and at least one weather station located at the processing facility: a processing device executing a gas emissions program communicatively coupled to each of the plurality of gas sensors and to the at least one weather station, that receives gas sensor data from the plurality of gas sensors and wind speed and direction data from the at least one weather station, wherein the gas emissions program uses the received sensor data and weather station data to correlate the wind speed and direction data with the gas sensor data to triangulate a location of the gas emission; calculate a mean concentration of the gas emission; and estimate the size of the gas emission using at least one of a base calculation model, a gaussian plume (GP) model fit, or an event probability model fit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The embodiment of the present disclosure describes a discretized geospatial model that aggregates wind speed and direction, and gas emission readings from multiple sensors, over a period of time, to determine an estimate of a size of one or more simultaneous gas emissions. The method of the disclosure uses a plurality of geographically distributed gas sensors, and one or more weather stations located about an industrial facility. As a multiple model-based approach, there is no need for a lengthy training and validation phase following sensor deployment.

The weather stations include one or more anemometers providing the wind speed and direction data. The weather stations calculate an average wind speed and direction over a given time interval. A maximum and minimum speed and wind direction is calculated over a moving time window. The length of the moving timer window of sample data is based on the wind velocity, the maximum expected gas detection range of the sensors and the frequency of the discrete sampled data. In practice this is implemented by computing multiple maximum and minimum speed, and wind directions, for a range of different moving window sizes, from which the most appropriate range is selected at any sample time. The method of the present disclosure takes account of the variability in the wind speed and direction. The weather stations are connected to a controller using one or more wireless gateways or wired I/O modules.

Figure 1:
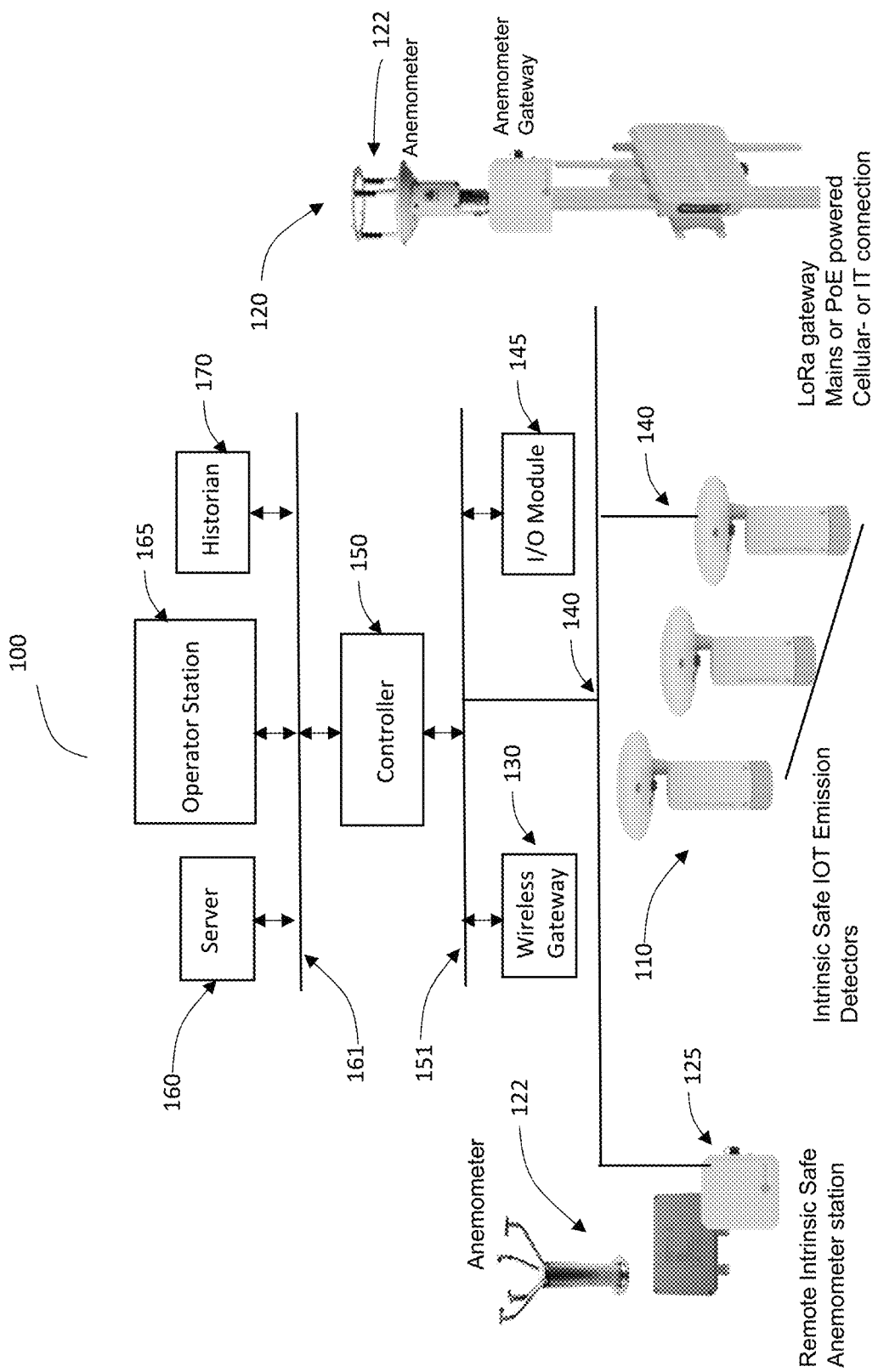
FIG. 1 is an illustration of a processing facility to determine a size of a gas emission in according to the present disclosure.
Figure 2:
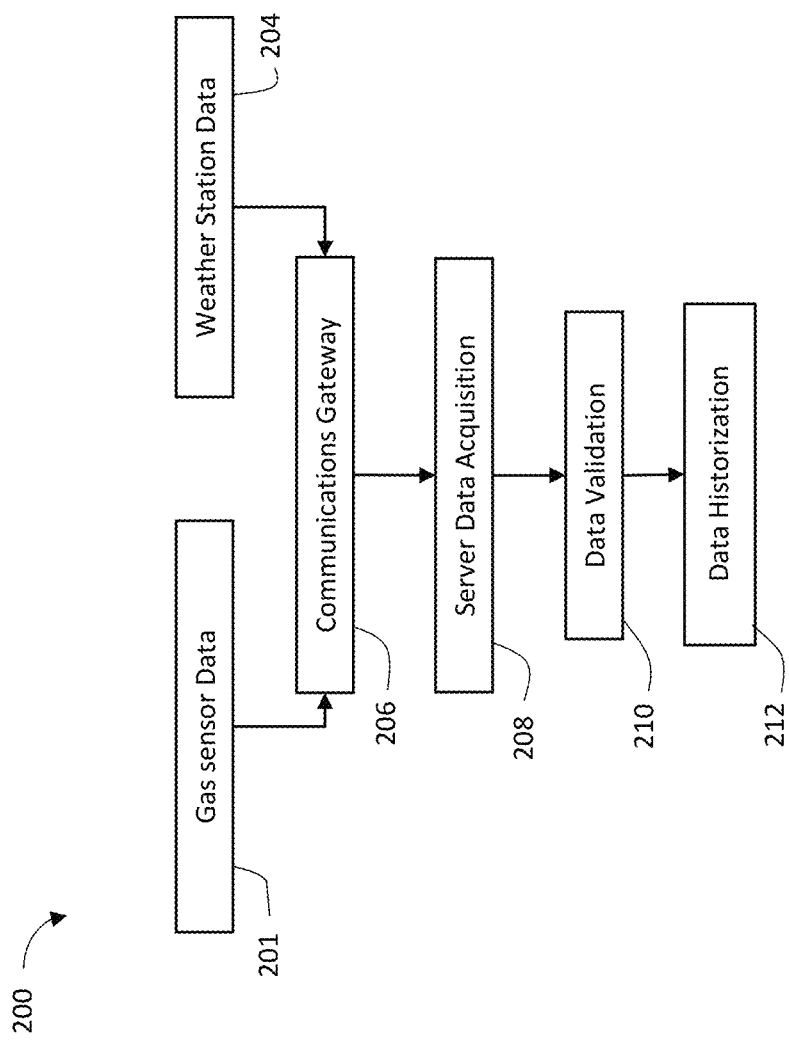
FIG. 2 is a diagram illustrating an exemplary method for the collection and pre-processing of gas sensor data and wind direction data in according to the present disclosure.

With reference to FIGS. 1 and 2 of the included drawings the system for determining the size of a gas emission leaked, vented or expelled from a processing facility or a plant 100 is illustrated. It should be noted that in the present disclosure a "gas emission" may be any combustion related emission of gas or gasses expelled or discharged to the atmosphere from the plant 100 or any uncontrolled fugitive, leaked or controlled vented or discharged emission of uncombusted gas, expelled or discharged to the atmosphere from the plant 100. A plurality of gas sensors 110 are geospatially distributed in around external area near assets of the processing facility, well-head, factory, or other refining or chemical manufacturing facility that may contain potential sources of gas emissions, hereinafter referred to as the plant 100. The gas sensors 110 may be comprised of Intrinsic Safe IoT Emission Detectors configured to provide signals representing gas concentrations at the sensors location. One or more weather stations 120 are also located near or amongst the gas sensors 110. The weather stations 120 are used to sense and report wind direction, wind speed, temperature and optionally humidity. The weather stations 120 may comprise an Anemometer 122 including integrated gateway such as LoRa gateway for wireless communication with a server as shown in FIG. 1. Also, FIG. 1 illustrates Remote Intrinsic Safe Anemometer station 125 connected with the controller 150 using a wired network 140 or using the wireless gateway 130. Remote Intrinsic Safe Anemometer station 125 configured to share the sensed data and reports of wind direction, wind speed, temperature and optionally humidity with the controller. Further, FIG. 1 illustrates a collection of gas sensors 110 distributed around the plant 100, together with weather stations 120. The gas sensors 110 measure the gas concentration levels at a specific time intervals such as for example, between 2 and 30 seconds and the weather stations 120 also record the wind direction and wind speed at the corresponding gas sensor reading intervals.

FIG. 1 illustrates an exemplary system 100 for gathering information from the gas sensors 110 and weather stations 120 and for processing the information gathered to determine a size of a gas emission expelled or discharged from the plant 100. At a device layer of the system 100 the gas sensors 110 and weather stations 120 are connected either to a wireless gateway 130 or through a wired network 140 to an I/O module 145. More than one gateway 130 may be deployed in the device layer with each gateway having a plurality of wireless gas sensors 110 and wireless weather stations 120 connected to the wireless gateway 130. Similarly, more than one I/O module 145 may be used to connect to a plurality of wired gas sensors 110 and wired weather stations 120 using a wired network 140 shown in FIG. 1.

At a control layer, the system 100 may include one or more controllers 150 connected to wireless gateway 130 and I/O module 145 via a control network 151. The controller 150 can be used in the system 100 to perform various functions in order to control the data gathering process from the gas sensors 110 and weather stations 120. For example, the controller 150 may act as a supervisor to control the transfer of sensor data and weather data from weather data collected by the gateway 130 and I/O module 145. The controller 150 can also be used to provide diagnostic information to the system 100 of the operational health of the wireless gateway 130, I/O module 145 and the gas sensors 110 and weather stations 120 connected to them.

The controller 150 transfers the collected data to a plant server 160 via plant network 161 located at a plant operations layer of the system 100. The server 160 denotes a computing device that executes data processing programs and applications including the method for locating and quantifying gas emissions of the present disclosure. The server 160 could represent a computing device running a WINDOWS operating system or other operating system. Note that while shown as being local within system 100, the functionality of the server 160 could be remote from the system 100. For instance, the functionality of the server 160 could be implemented in a computing cloud or a remote server communicatively coupled to the control and automation system 100 via a gateway.

Operator access to and interaction with the controller 150 and other components of the system 100 can occur via one or more operator consoles included in an operator station 165 connected to plant network 161. Each operator console 165 could be used to provide information to an operator and receive information from an operator. For example, each operator console 165 could provide information identifying a current state of a plant process, such as the reported values of gas sensors 110 and weather data from the weather stations 120 and various displays providing information concerning any gas emissions detected by the emissions process of the present disclosure. Each operator console 165 could also receive information affecting how the industrial process is controlled, such as by receiving setpoints or control modes for the gas sensors 110 and weather stations 120 that alters or affects how the controller 150 controls the system 100. Each operator console 165 includes any suitable structure for displaying information to and interacting with an operator. For example, each operator console 165 could represent a computing device running a WINDOWS operating system or other operating system.

The plant operations layer of system 100 also includes at least one historian 170. The historian 170 represents a component that stores various information about the system 100. The historian 170 could, for instance, store information that is gathered by the gas sensors 110 and weather stations 120 for processing by server 160. The historian 170 includes any suitable structure for storing and facilitating retrieval of information. Although shown as a single component here, the historian 170 could be located elsewhere in the system 100, or multiple historians could be distributed in separate locations in the system 100.

Although FIG. 1 illustrates one example of a system 100, various changes may be made to FIG. 1. For example, the system 100 could include any number of sensors, actuators, controllers, networks, operator consoles, control rooms, historians, servers, wireless devices, and other components. Also, the makeup and arrangement of the system 100 in FIG. 1 are for illustration only. Components could be added, omitted, combined, further subdivided, or placed in any other suitable configuration according to particular needs. Further, particular functions have been described as being performed by particular components of the system 100. This is for illustration only. In general, control systems are highly configurable and can be configured in any suitable manner according to particular needs.

With reference to FIG. 2, the initial data collection and pre-processing workflow 200 of the method of the present disclosure is illustrated. The sensor data 201 read from the gas sensors 110 and the weather data 204 read from weather stations 120 are transmitted in operation 206 wirelessly to the local gateway 130 or via wired network to I/O module 140. The sensor data 201 and weather data 204 are then transferred by controller 150 and acquired by the server 160 in the step of server data acquisition 208. In operation 210, the sensor data 201 and weather data 204 are validated to remove erroneous values defined as bad data, including but not limited to: (i) the quality status for the gas sensor data 201 and weather data 204 that are outside of a high and low range is set as bad data: (ii) the quality status for the gas sensor data 201 and weather data 204 that exhibit a high rate of change above a pre-defined limit is set as bad data for the current timestamp and a configurable number of subsequent sample intervals: (iii) the quality status for the gas sensor data 201 and weather data 204 that remain frozen at for example, a non-zero value for more than a pre-defined period of time is set as bad data; and (iv) the quality status for the gas sensor data 201 and weather data 204 that do not send a new value update from a gas sensor 110 or weather station 120 within a predefined period of time is set as bad data. The valid weather data consists of: windspeed; windspeed data quality; wind direction; wind direction data quality; temperature; temperature data quality; humidity; humidity data quality; pressure; pressure data quality; for each weather station 120 together with the weather stations location such as the latitude, longitude, and altitude of the weather station. The valid gas sensor data from the historian 170 can be sampled for a historical time window of data, typically ending at the current time, except for post analysis use cases. The duration of the historical time window can be adapted based on the information content and the accuracy of results required. For example, if the gas detection events are infrequent a longer time windows will generally be required to estimate one or more gas emission sources. The validated gas sensor and weather station data is stored in historian 170 in operation 212 for later retrieval by the workflow of FIG. 3.

Figure 3:
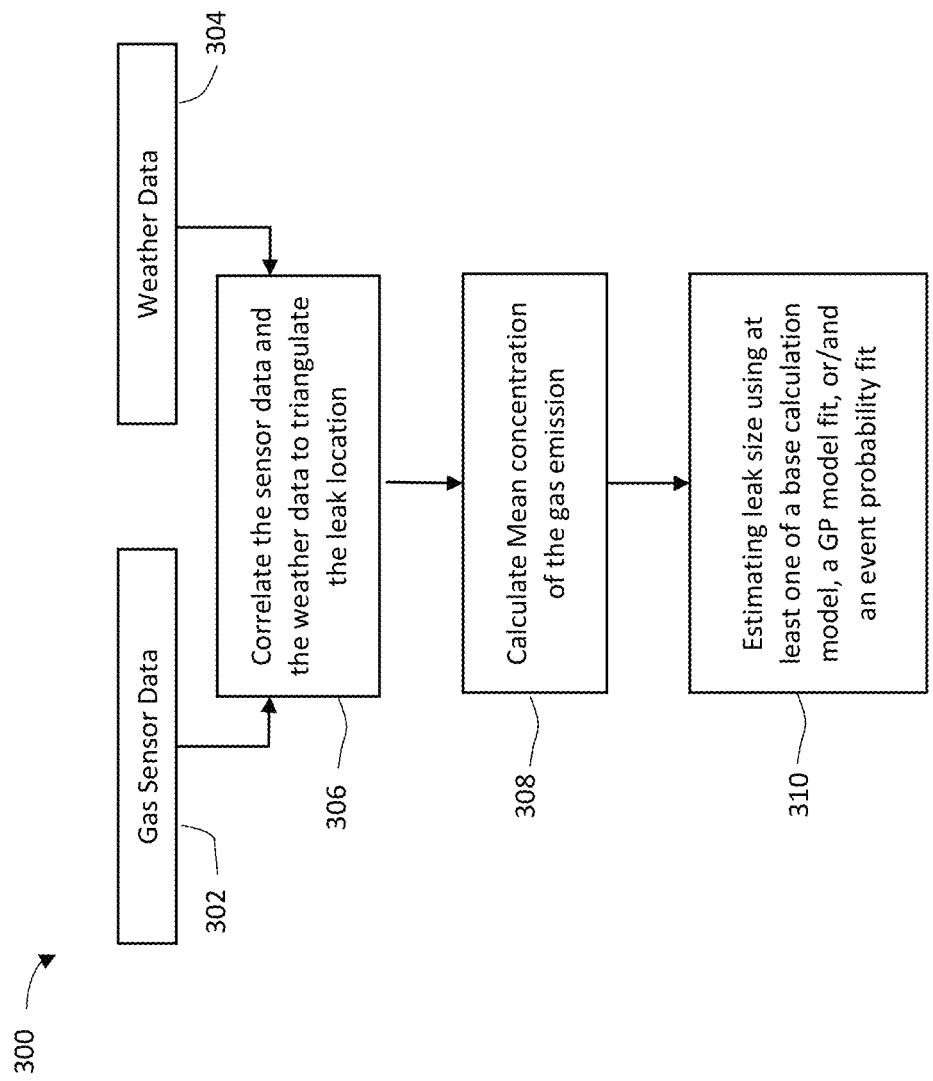
FIG. 3 is a flow chart illustrating of an exemplary method to determine a size of a gas emission in according to the present disclosure.

FIG. 3 illustrates a method to determine the size of a gas emission according to the present disclosure. The server 160 fetches the validated data stored in historian 170 by the initial data collection and pre-processing workflow 200. Next in operation 306, the weather data 301 and sensor data 304 are correlated to triangulate a location of a gas emission. Non-zero gas sensor data is paired with the corresponding wind direction and windspeed data on the basis of the nearest timestamp. If multiple weather stations 120 are available, the values of the gas sensors data 301 are paired with the geographically nearest valid wind direction and wind speed data that is nearest to each gas sensor 120 in operation 306 to triangulate the location of the gas emission by correlating the weather data 301 and sensor data 304. It is to be noted that triangulation of locations requires sensor readings from at least two sensors, which for a fixed gas emission location requires at least two wind directions. Because of the stochastic nature of wind and lag during the travel (dead) time of a gas molecule from a gas emission to the sensors and the need to acquire data over multiple wind directions, it is important to integrate sensor readings for some period before triangulation can make place. Longer integration periods result in increased confidence when triangulating at the expense of a delay in producing the prediction. This disclosure uses an adaptive process for time windowing of these sensor values. The integration period can be redefined from a fixed window of time to a period required to meet certain conditions required for confident predictions.

In operation 308, the method 300 calculates a mean concentration of the gas emission based on the correlation of the weather data 301 and sensor data 304. Next in operation 310, the method estimates the size of the gas emission using at least one of a base calculation model, a Gaussian Plume (GP) model fit, or an event probability model fit. The three models may be executed by the controller 150 individually or all three in combination, to provide an estimate of the gas emission discharged.

Figure 4:
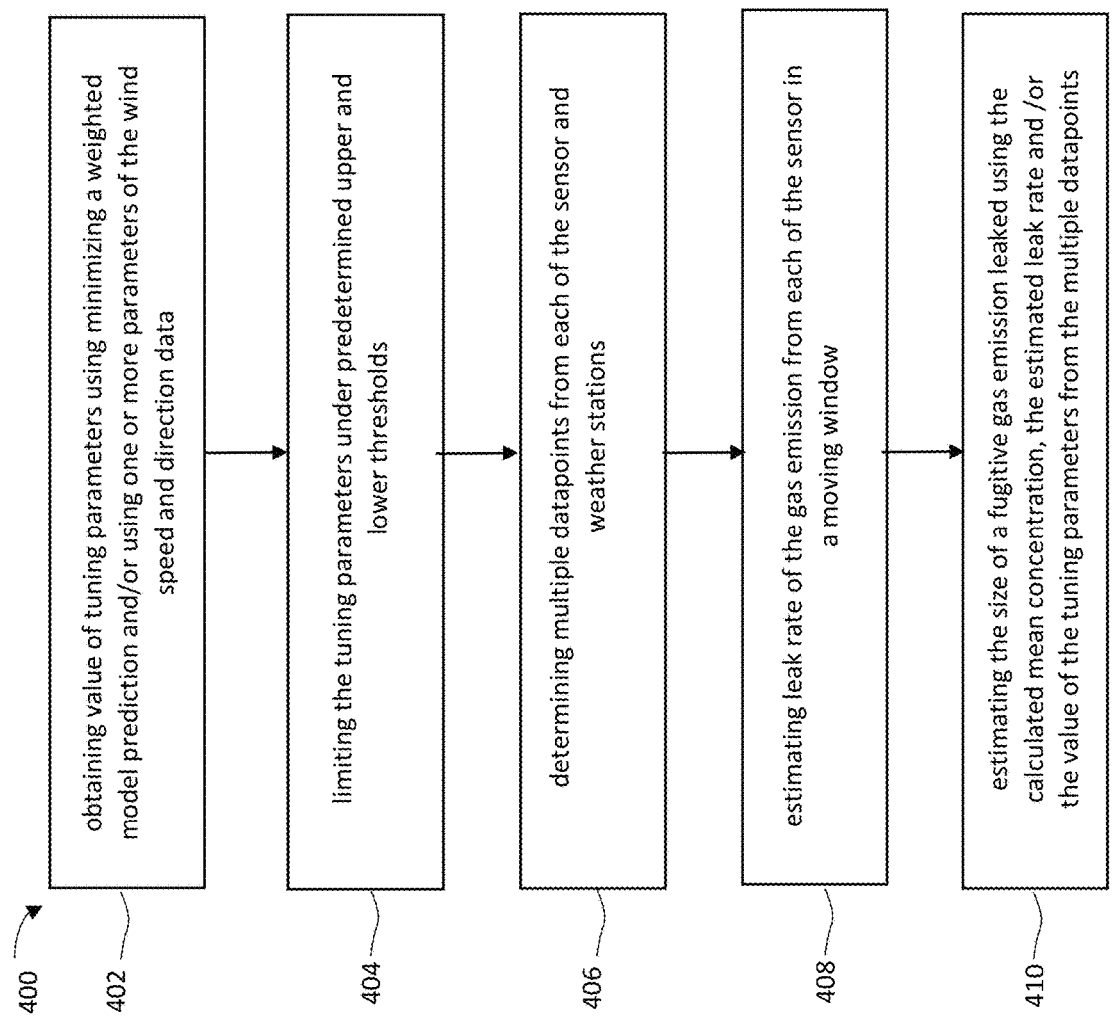
FIG. 4 is a flow chart illustrating of an exemplary method to determine a size of a gas emission using a base calculation model in according to the present disclosure.

FIG. 4 illustrates a method (400) to determine a size of a gas emission using a base calculation model according to the present disclosure. In operation 402 a value of tuning parameters ($I_y$ and $I_z$) is obtained by at least one of minimizing a weighted model prediction error over a training data set into the base calculation model or using one or more parameters of the wind speed and direction data from the at least one weather station. Next the tuning parameters are limited under predetermined upper and lower thresholds in operation 404. The limiting of the tuning parameter ($I_y$ and $I_z$) is calculated to $0.01 < I_y < 0.5$ and $0.02 < I_z < 0.2$ in:

$$\min_{I_y I_z} \sum w \left( C_m - \frac{Q}{U \pi I_y I_z x^2} e^{-\frac{y^2}{2 I_y^2 x^2}} \right)^2,$$

$$\text{where } w = e^{\frac{-abs(\theta)}{k}}.$$

where:
$I_y$=gas dispersion factor in y direction,
$I_z$=gas dispersion factor in z direction,
$C_m$=mean concentration of diffusing substance,
y=downwind distance [m],
z=crosswind distance [m],
Q=contaminant emission rate [kg/s],
U=mean wind velocity in downwind direction [m/s],
θ=angular deviation in Y, Z plane.

FIG. 4 illustrates in operation 406 determining multiple datapoints from each of the sensor and weather stations. The determination of the multiple datapoints including mean concentration (C), mean wind velocity (U), downwind distance (x) and crosswind distance (y) from each of the sensor of the plurality of sensors to estimate emission rate from each of the sensor using below:

$$Q_i = \frac{C_i U_i \pi I_y I_z x_1^2}{e^{\left(\frac{-y_1^2}{2I_y^2 x_1^2}\right)}}$$

In operation 408 the leak rate of the gas emission from each of the sensors is estimated in a moving window. The leak rate (Q) of the gas emission is estimated using a weighted average of the Qi for each emission detection event in a moving window using:

$$Q = \frac{\sum_{i=1,n} w_i Q_i}{\sum_{i=1,n} w_i}$$

$$w = e^{\frac{-abs(\theta)}{k}}$$

In operation 410 the size of a gas emission is estimated using the calculated mean concentration, the estimated leak rate and/or the value of the tuning parameters from the multiple datapoints.

Figure 5:
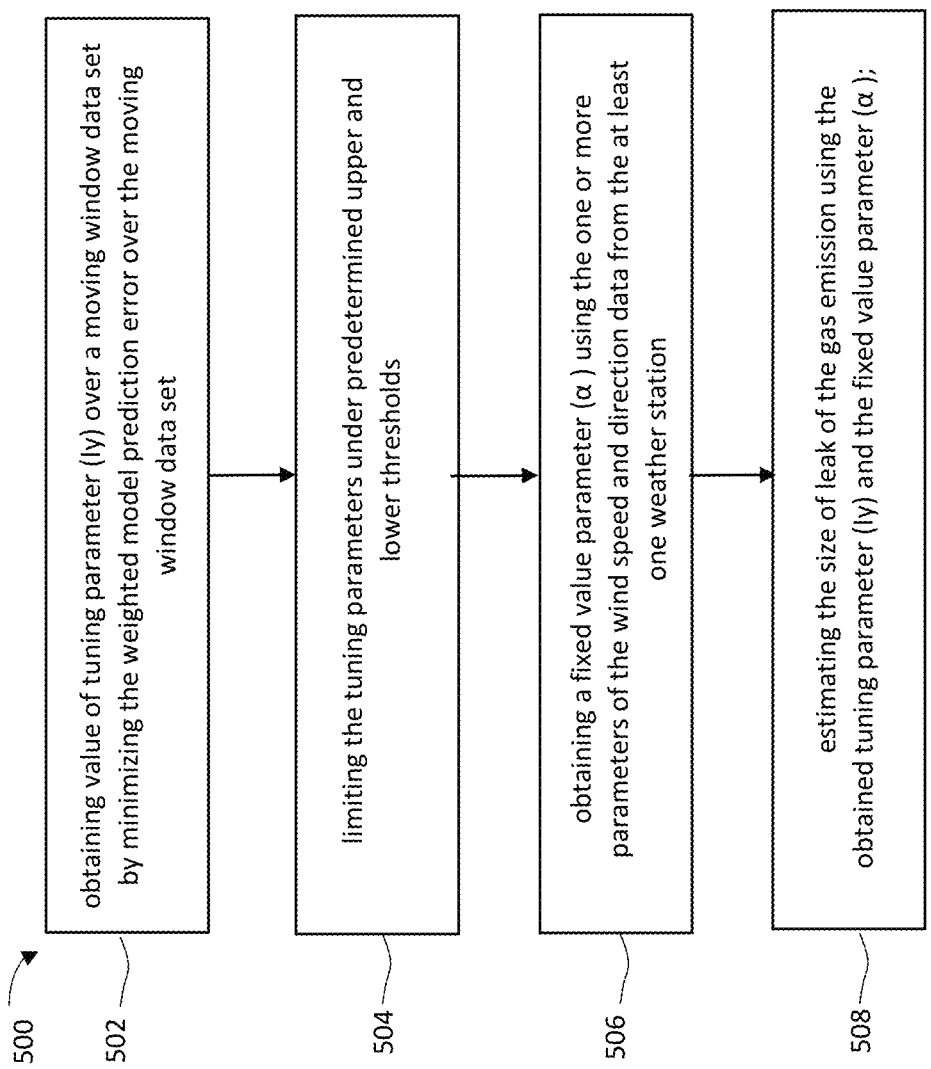
FIG. 5 is a flow chart illustrating of an exemplary method to determine a size of a gas emission using a Gaussian Plume (GP) fit model in according to the present disclosure.

FIG. 5 illustrates a method (500) to determine a size of a gas emission using a Gaussian Plume (GP) model fit according to the present disclosure. In operation 502 a tuning parameter ($I_y$) is obtained over a moving window data set by minimizing the weighted model prediction error over the moving window data set. In operation 504 the tuning parameters are limited under predetermined upper and lower thresholds. The limiting tuning parameter ($I_y$) calculated to $0.1 < I_y < 0.25$ in:

$$\min_{Q, I_y} \sum w \left( C_m - \frac{Q}{U \pi \alpha I_y^2 x^2} e^{\frac{y^2}{2I_y^2 x^2}} \right)^2,$$

with $w = e^{\frac{-abs(\theta)}{k}}$ and $\alpha = I_y / I_z$, where:
- α is a fixed tuning parameter determined from the experimental data,
- $I_y$ is a fixed in any moving window of data but varies within sequential windows of data,
- Q is estimated directly from the model fit.

A fixed value parameter (a) is obtained in operation 506 using the one or more parameters of the wind speed and direction data from the at least one weather station. In operation 508 the size of the gas emission is estimated using the obtained tuning parameter (Iy) and the fixed value parameter (α).

Figure 6:
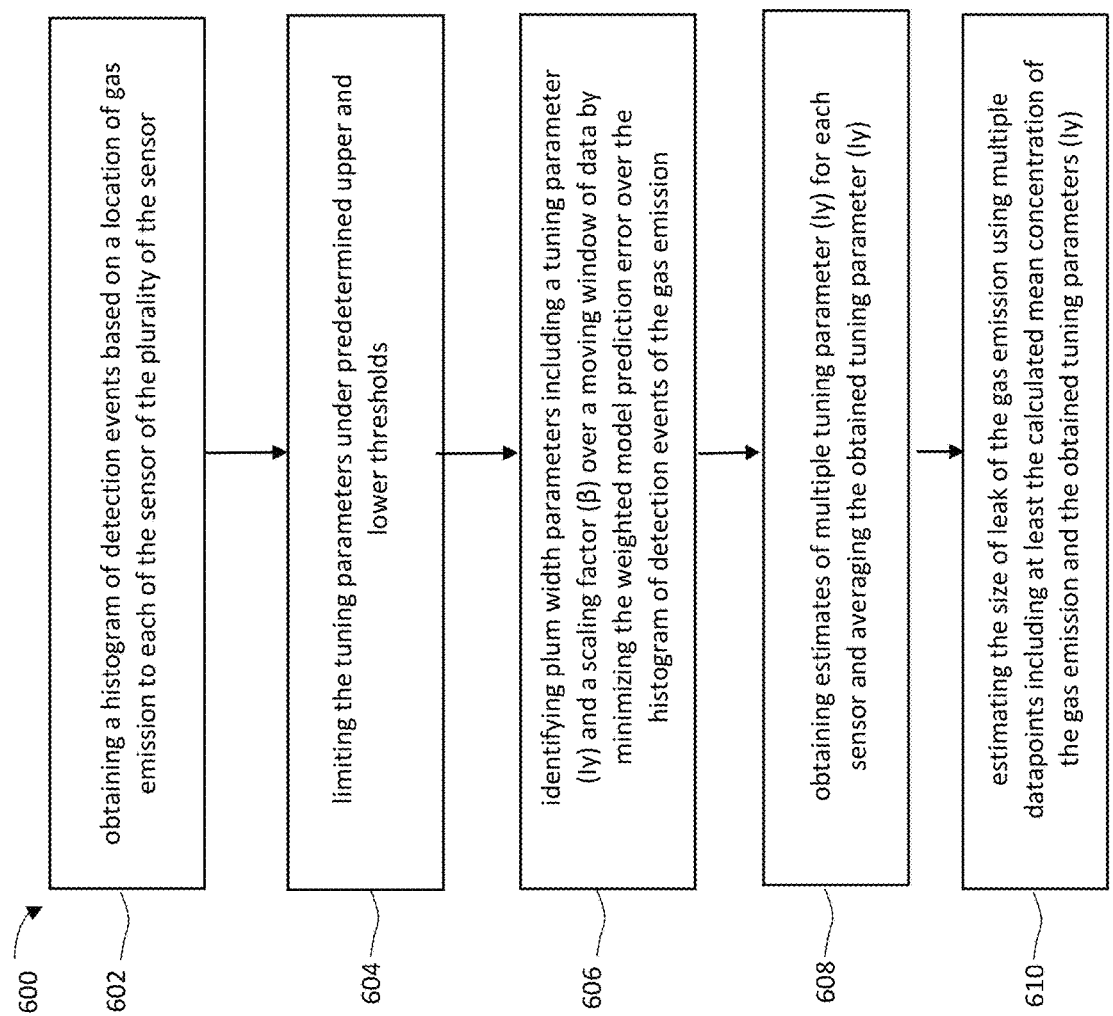
FIG. 6 is a flow chart illustrating of an exemplary method to determine a size of a gas emission using an event probability fit model in according to the present disclosure.

FIG. 6 illustrates a method (600) to determine the size of a gas emission using an event probability model fit according to the present disclosure. In operation 602 a histogram of detection events is obtained based on a location of gas emission to each sensor of the plurality of sensors. In operation 604 the tuning parameters are limited under predetermined upper and lower thresholds. The limiting tuning parameter ($I_y$) to $\alpha < I_y < b$ in:

$$\min_{I_y} \left( \sum_{i=1}^{n} \left( \text{Count}_\theta - \frac{\beta}{I_y x} e^{-\frac{y^2}{2I_y^2 x^2}} \right)^2 \right)$$

where:
β is a scaling factor determined by detector parameters.

In operation 606 the plume width parameters are identified including a tuning parameter (Iy) and a scaling factor (β) over a moving window of data by minimizing the weighted model prediction error over the histogram of detection events of the gas emission. Next in operation 608 estimates are obtained of multiple tuning parameter (Iy) for each sensor by averaging the obtained tuning parameter (Iy). In operation 610 the size of the gas emission is estimated using multiple datapoints including at least the calculated mean concentration of the gas emission and the obtained tuning parameters (Iy).

Figure 7:
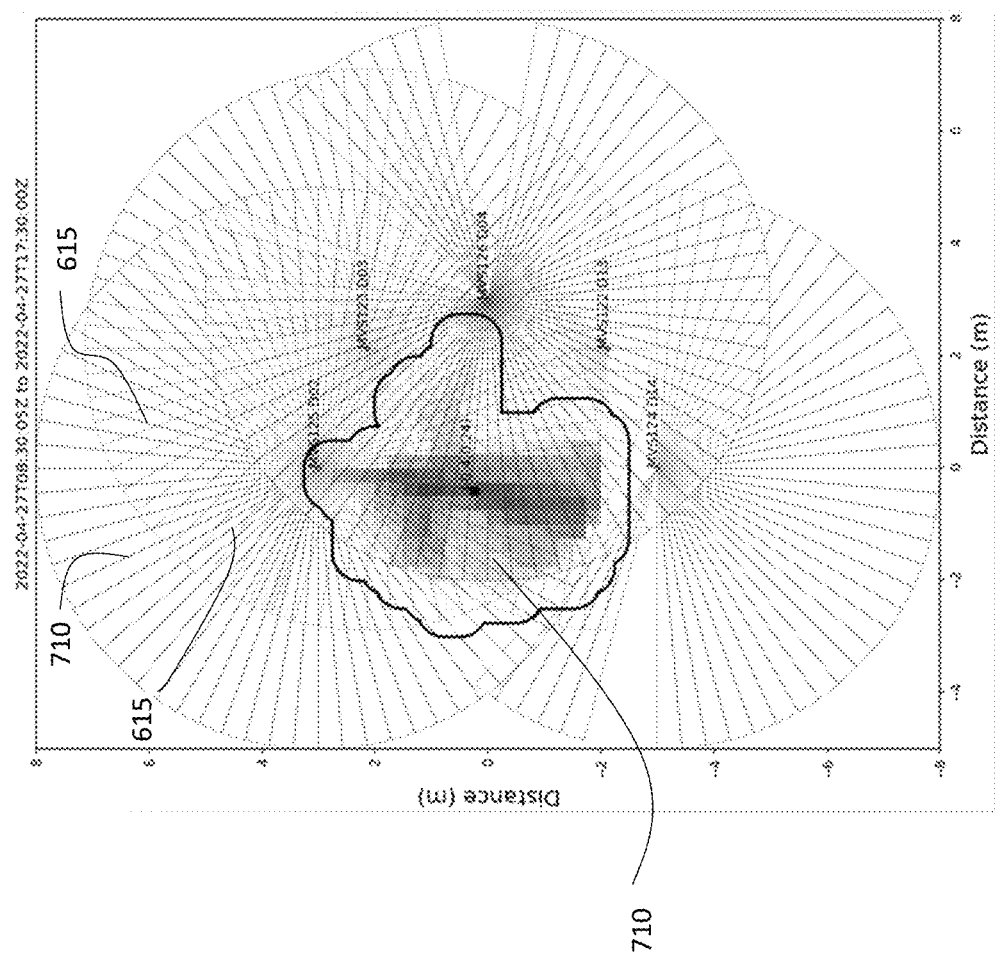
FIG. 7 is a diagram illustrating a method for the geospatial triangulation of the aggregated data to determine a size of a gas emission from FIG. 3 according to the present disclosure.

FIG. 7 illustrates a graph for triangulation that determines a size of a gas emission according to the present disclosure. For each newly identified gas emission leak area identified based on the last historical window of data of the workflow of FIG. 3, a correlation is sought with a previously identified leak area from prior data sets stored in the historian 170. With references to FIGS. 5-7 the geospatial triangulation method 300 of the disclosure is shown. Depending on whether there is significant height change across the potential gas emission locations and different sensor positions, either a two-dimensional planar grid or three-dimensional array of volumes is defined in order to describe potential emission locations within the facility. The individual grid/volume resolution is configurable in operation 506 which develops a plurality of conical projections 710 denoted by boundaries 715. The conical projections would be displayed on a display monitor of the operator station 165. The two-dimensional planar grid comprised of a grid of cells will be used to explain the method of the present disclosure. For each conical projection 710 shown in FIG. 7, the workflow of FIG. 3 computes in operation 306 intersections for the cone projections with all the plant/site grid cells. In each case, the aggregated gas sensor data readings are added to an accumulated gas concentration value within each grid cell based on the area of intersection. Any element wholly within the cone receives a full allocation. Partial intersections receive an allocation based on the area of overlap. In FIG. 7, the accumulated gas concentration values in each grid cell are illustrated by the degree of shading concentration. On a colour display monitor of an operator station for example, the degree of shading may be illustrated to a user using concentrations of a specific colour to show the accumulated gas concentrations.

This correlation process is primarily based on heuristics including: (i) if there is a significant area overlap (as defined by a % limit) between a newly identified leak area and an existing leak area, then the new leak is matched with the old leak and the existing leak area is updated based on a weighted combination of the intersection and the union of the two areas; (ii) if the new leak area significantly overlaps multiple existing leak areas, then the existing leak areas are combined otherwise, the newly identified leak is assigned a new leak id and added to the list of existing leak areas; and (iii) leak areas that have not been observed for a configurable period of time are not reported to the leak detection method. Their location is persisted for another configurable period of time. A centroid 710 is calculated for the leak area source based on the shape and level of gas estimated for each grid cell area. The estimated location of the leak(s), together with the magnitudes of the emissions detected around the suspected leak is used with a sensor type specific calibration model to provide an initial estimate of the leak size. The initial estimate of leak size is then used as the initial conditions for a non-linear first principles model that more accurately quantifies the leak rate.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for determining a size of a gas emission expelled from a processing facility, comprising the steps of:
   obtaining, by a processing device, gas sensor data from a plurality of gas sensors, and wind speed and direction data from at least one weather station located at the processing facility;
   correlating, by the processing device, the wind speed and direction data with the gas sensor data to triangulate a location of the gas emission;
   calculating, by the processing device, a mean concentration of the gas emission;
   estimating, by the processing device, the size of the gas emission using at least an event probability fit, wherein estimating the size of the gas emission further comprises:
   (a) obtaining a histogram of emission detection events based on the location of gas emissions from each sensor of the plurality of the sensors,
   (b) identifying plume width parameters including a tuning parameter ($I_y$) and a scaling factor ($\beta$) over a moving window of data by minimizing weighted model prediction error over the histogram of detection events of the gas emission,
   (c) obtaining estimates of multiple tuning parameter ($I_y$) for each sensor and averaging the obtained tuning parameter ($I_y$),
   (d) estimating the size of the gas emission using multiple datapoints including at least the calculated mean concentration of the gas emission and the obtained tuning parameters ($I_y$); and
   displaying, by the processing device, information associated with the location of the gas emission, the mean concentration of the gas emission in the location and the size of the gas emission, on an operator console.

2. The method of claim 1, wherein estimating the size of the gas emission further comprises estimating the size of the gas emission using a base calculation model, wherein estimating the size of the gas emission using the base calculation model comprises:
   (a) obtaining a value of tuning parameters ($I_y$ and $I_z$) by at least one of:
      minimizing a weighted model prediction error over a training data set into the base calculation model; or
      using one or more parameters of the wind speed and direction data from the at least one weather station;
   (b) estimating the size of the gas emission using multiple datapoints including at least the calculated mean concentration of the gas emission and the value of the tuning parameters ($I_y$ and $I_z$).

3. The method of claim 2, wherein estimating the size of the gas emission using the base calculation model further comprises:
   limiting tuning parameter ($I_y$ and $I_z$) to $0.01 < I_y < 0.5$ and $0.02 < I_z < 0.2$ in $$\min_{I_y I_z}\left(\sum_{i=1}^{n}\left(w\left(C_m - \frac{Q}{U\pi I_y I_z x^2}e^{-\frac{y^2}{2I_y^2 x^2}}\right)^2\right)\right), \text{ where } w = e^{\frac{-abs(\theta)}{k}};$$

and
   determining the multiple datapoints including mean concentration (C), mean wind velocity (U), downwind distance (x) and crosswind distance (y) from each of the sensor of the plurality of sensors to estimate emission rate from each of the sensor using $$Q_i = \frac{C_i U_i \pi I_y I_z x_i^2}{e^{\left(\frac{-y_i^2}{2I_y^2 x_i^2}\right)}},$$

where:
$C_m$=mean concentration of diffusing substance,
y=downwind distance [m],
z=crosswind distance [m],
Q=contaminant emission rate [kg/s],
U=mean wind velocity in downwind direction [m/s],
$\theta$=angular deviation in Y, Z plane.

4. The method of claim 3, wherein estimating the size of the gas emission using the base calculation model, further comprises:
estimating a leak rate (Q) of the gas emission using a weighted average of the Qi for each emission detection event in a moving window using:

$$Q = \frac{\sum_{i=1,n} w_i Q_i}{\sum_{i=1,n} w_i} \quad w = e^{\frac{-abs(\theta_i)}{k}}.$$

5. The method of claim 1, wherein estimating the size of the gas emission further comprises estimating the size of the gas emission using a GP model fit, wherein estimating the size of the gas emission using the GP model fit comprises:
(a) obtaining a tuning parameter ($I_y$) over a moving window data set by minimizing a weighted model prediction error over the moving window data set,
(b) obtaining a fixed value parameter ($\alpha$) using the one or more parameters of the wind speed and direction data from the at least one weather station,
(c) estimating the size of the gas emission using the obtained tuning parameter ($I_y$) and the fixed value parameter ($\alpha$).

6. The method of claim 5, wherein the step of estimating the size of the gas emission using the GP model fit further comprises:
limiting tuning parameter ($I_y$) to $0.1 < I_y < 0.25$ in:

$$\min_{Q_y, I_y} \left( \sum_{i=1}^{n} \left( w \left( C_m - \frac{Q}{U \pi \alpha I_y^2 x^2} e^{-\frac{y^2}{2I_y^2 x^2}} \right)^2 \right) \right),$$

with $w = e^{\frac{-abs(\theta)}{k}}$ and $\alpha = I_y/I_z$, where:
$\alpha$ is a fixed tuning parameter determined from experimental data,
$I_y$ is a fixed in any moving window of data but varies within sequential windows of data,
Q is estimated directly from the model fit.

7. The method of claim 1, wherein estimating the size of the gas emission using the event probability fit further comprises:
limiting tuning parameter ($I_y$) to $a < I_y < b$ in:

$$\min_{I_y} \left( \sum_{i=1}^{n} \left( \text{Count}_\theta - \frac{\beta}{I_y x} e^{-\frac{y^2}{2I_y^2 x^2}} \right)^2 \right)$$

where:
$\beta$ is a scaling factor determined by detector parameters.

8. The method of claim 7, wherein estimating the size of the gas emission using the event probability fit further comprises:
determining the histogram and regression on each of the sensor based on a varying distance of each sensor from the location of the gas emission,
estimating $I_y$ for each of the sensor and then averaging.

9. The method of claim 8, wherein the step of estimating the size of the gas emission using the event probability fit, further comprises:

determining the multiple datapoints including mean concentration (C), mean wind velocity (U), downwind distance (x) and crosswind distance (y) from each of the sensor of the plurality of sensors to estimate emission rate from each of the sensor using $$Q_i = \frac{C_i U_i \pi I_y I_z x_i^2}{e^{\left(\frac{-y_i^2}{2I_y^2 x_i^2}\right)}};$$

and
estimating a leak rate (Q) of the gas emission using a weighted average of the Qi for each emission detection event in a moving window using $$Q = \frac{\sum_{i=1,n} w_i Q_i}{\sum_{i=1,n} w_i} \quad w = e^{\frac{-abs(\theta_i)}{k}}.$$

10. A system to determine a size of a gas emission expelled from a processing facility, the system comprising:
a plurality of gas sensors and at least one weather station located at the processing facility;
a processing device executing a gas emissions program communicatively coupled to each of the plurality of gas sensors and to the at least one weather station, wherein the processing device is configured to:
receive gas sensor data from the plurality of gas sensors and wind speed and direction data from the at least one weather station,
correlate the wind speed and direction data with the gas sensor data to triangulate a location of the gas emission;
calculate a mean concentration of the gas emission; and
estimate the size of the gas emission using at least an event probability fit, wherein to estimate the size of the gas emission using at least the event probability fit, the processing device is further configured to:
(a) obtain a histogram of emission detection events based on the location of gas emissions from each sensor of the plurality of the sensors,
(b) identify plume width parameters including a tuning parameter ($I_y$) and a scaling factor ($\beta$) over a moving window of data by minimizing weighted model prediction error over the histogram of detection events of the gas emission,
(c) obtain estimates of multiple tuning parameter ($I_y$) for each sensor and averaging the obtained tuning parameter ($I_y$),
(d) estimate the size of the gas emission using multiple datapoints including at least the calculated mean concentration of the gas emission and the obtained tuning parameters ($I_y$); and
display information associated with the location of the gas emission, the mean concentration of the gas emission in the location and the size of the gas emission, on an operator console.

11. The system of claim 10, wherein the processing device is further configured to:
estimate the size of the gas emission using the base calculation model, wherein estimating the size of the gas emission using the base calculation model comprises;

(a) obtaining a value of tuning parameters ($I_y$ and $I_z$) by at least one of:
  minimizing a weighted model prediction error over a training data set into the base calculation model; or
  using one or more parameters of the wind speed and direction data from the at least one weather station;
(b) estimating the size of the gas emission using multiple datapoints including at least the calculated mean concentration of the gas emission and the value of the tuning parameters ($I_y$ and $I_z$).

12. The system of claim 11, wherein to estimate the size of the gas emission using the base calculation model, the processing device is further configured to:
limit tuning parameter ($I_y$ and $I_z$) to $0.01 < I_y < 0.5$ and $0.02 < I_z < 0.2$ in $$\min_{I_y, I_z}\left(\sum_{i=1}^{n}\left(w\left(C_m - \frac{Q}{U\pi I_y I_z x^2}e^{-\frac{y^2}{2I_y^2 x^2}}\right)^2\right)\right), \text{ where } w = e^{\frac{-abs(\theta)}{k}};$$

and
determine the multiple datapoints including mean concentration (C), mean wind velocity (U), downwind distance (x) and crosswind distance (y) from each of the sensor of the plurality of sensors to estimate emission rate from each of the sensor using $$Q_i = \frac{C_i U_i \pi I_y I_z x_i^2}{e^{\left(\frac{-y_i^2}{2I_y^2 x_i^2}\right)}},$$

where:
$C_m$=mean concentration of diffusing substance,
y=downwind distance [m],
z=crosswind distance [m],
Q=contaminant emission rate [kg/s],
U=mean wind velocity in downwind direction [m/s],
θ=angular deviation in X, Y plane.

13. The system of claim 12, wherein to estimate the size of the gas emission using the base calculation model, the processing device is further configured to:
estimate a leak rate (Q) of the gas emission using a weighted average of the Qi for each emission detection event in a moving window using:

$$Q = \frac{\sum_{i=1,n} w_i Q_i}{\sum_{i=1,n} w_i} \quad w = e^{\frac{-abs(\theta_i)}{k}}.$$

14. The system of claim 10, wherein the processing device is further configured to:
estimate the size of the gas emission using the GP model fit, wherein estimating the size of the gas emission using the GP model fit comprises:
  (a) obtaining a tuning parameter ($I_y$) over a moving window data set by minimizing weighted model prediction error over the moving window data set,
  (b) obtaining a fixed value parameter ($\alpha$) using the one or more parameters of the wind speed and direction data from the at least one weather station,
  (c) estimating the size of the gas emission using the obtained tuning parameter ($I_y$) and the fixed value parameter ($\alpha$).

15. The system of claim 14, wherein to estimate the size of the gas emission using the GP model fit, the processing device is further configured to:
limit tuning parameter ($I_y$) to $0.1 < I_y < 0.25$ in:

$$\min_{Q_y, I_y}\left(\sum_{i=1}^{n}\left(w\left(C_m - \frac{Q}{U\pi\alpha I_y^2 x^2}e^{-\frac{y^2}{2I_y^2 x^2}}\right)^2\right)\right),$$

with $w = e^{\frac{-abs(\theta)}{k}}$ and $\alpha = I_y/I_z$.

where:
$\alpha$ is a fixed tuning parameter determined from experimental data,
$I_y$ is a fixed in any moving window of data but varies within sequential windows of data,
Q is estimated directly from the model fit.

16. The system of claim 10, wherein to estimate the size of gas emission using the event probability fit, the processing device is further configured to:
limit tuning parameter ($I_y$) to $\alpha < I_y < b$ in:

$$\min_{I_y}\left(\sum_{i=1}^{n}\left(\text{Count}_\theta - \frac{\beta}{I_y x}e^{-\frac{y^2}{2I_y^2 x^2}}\right)^2\right)$$

where:
$\beta$ is a scaling factor determined by detector parameters.

17. The system of claim 16, wherein to estimate the size of the gas emission using the event probability fit, the processing device is further configured to:
determine the histogram and regression of each of the plurality of sensors based on a varying distance of each sensor from the location of the gas emission,
estimate $I_y$ for each sensor and then averaging.

18. The system of claim 17, wherein to estimate the size of the gas emission using the event probability fit, the processing device is further configured to:
determine the multiple datapoints including mean concentration (C), mean wind velocity (U), downwind distance (x) and crosswind distance (y) from each of sensor of the plurality of sensors to estimate an emission rate from each of the sensor using $$Q_i = \frac{C_i U_i \pi I_y I_z x_i^2}{e^{\left(\frac{-y_i^2}{2I_y^2 x_i^2}\right)}};$$

and
estimate a leak rate (Q) of the gas emission using a weighted average of the Qi for each emission detection event in a moving window using $$Q = \frac{\sum_{i=1,n} w_i Q_i}{\sum_{i=1,n} w_i} \quad w = e^{\frac{-abs(\theta_i)}{k}}.$$

* * * * *